United States Patent
Genelot

(10) Patent No.: US 7,350,271 B2
(45) Date of Patent: Apr. 1, 2008

(54) COMPACT ELASTIC HINGE ELEMENT FOR A SPECTACLE FRAME

(75) Inventor: Nicolas Genelot, Folgensbourg (FR)

(73) Assignee: Comotec, Les Rousses (FR)

( * ) Notice: Subject to any disclaimer, the term of this patent is extended or adjusted under 35 U.S.C. 154(b) by 0 days.

(21) Appl. No.: 11/555,773

(22) Filed: Nov. 2, 2006

(65) Prior Publication Data

US 2007/0089268 A1    Apr. 26, 2007

Related U.S. Application Data

(63) Continuation of application No. PCT/FR2005/000820, filed on Apr. 5, 2005.

(30) Foreign Application Priority Data

May 6, 2004    (FR)    .................................. 04 04911
May 27, 2004   (FR)    .................................. 04 05711

(51) Int. Cl.
    G02C 5/22    (2006.01)
(52) U.S. Cl. ........................................ 16/228; 351/113
(58) Field of Classification Search ................. 16/228; 351/113–114, 140, 111, 153, 158
    See application file for complete search history.

(56) References Cited

U.S. PATENT DOCUMENTS 3,744,887 A * 7/1973 Dunbar ........................ 351/153
4,991,258 A   2/1991 Drlik
5,657,107 A * 8/1997 Wagner et al. ............... 351/113
6,241,354 B1 * 6/2001 Schuchard et al. .......... 351/113
6,505,933 B2 * 1/2003 Schuchard et al. .......... 351/113
6,892,422 B2 * 5/2005 Schuchard .................... 16/228
6,996,876 B2 * 2/2006 Montagner .................... 16/228
2003/0172492 A1   9/2003 Schuchard

FOREIGN PATENT DOCUMENTS

| DE | 10216514 C1 * | 12/2003 |
| FR | 2 739 197 A | 3/1997 |
| FR | 2741459 A1 * | 5/1997 |
| FR | 2 793 323 A | 11/2000 |
| WO | 0068730 A1 | 11/2000 |

* cited by examiner

Primary Examiner—Chuck Y. Mah
(74) Attorney, Agent, or Firm—Panitch Schwarze Belisario & Nadel LLP

(57) ABSTRACT

The invention relates to an elastic hinge element (60) for a spectacle frame, comprising a body (10) consisting of a housing (11) comprising a guiding area (12) and at least one cavity comprising a retaining partition, a slide (20) fitted in the housing and comprising a guided part (22), a center part and a rod, a spring (40) for returning the slide to a rest position, mounted around the rod, and a bushing (30) forming a front stop for the spring. According to the invention, the cavity comprising the retaining partition is located in the guiding area (12) and opens out therein, and the guided part (22) of the slide comprises a recess into which an elastic tab (32) of the slide extends. Advantage: creation of a short-length hinge element.

13 Claims, 3 Drawing Sheets

COMPACT ELASTIC HINGE ELEMENT FOR A SPECTACLE FRAME

CROSS-REFERENCE TO RELATED APPLICATIONS

This application is a continuation of International Application No. PCT/FR2005/000820 filed Apr. 5, 2005, which was published in the French language on Dec. 22, 2005, under International Publication No. WO 2005/121873 A1 and claims priority to French Patent Application Nos. 0404911, filed May 6, 2004 and 0405711, filed May 27, 2004, the disclosures of which are incorporated herein by reference in their entirety.

The present invention relates to the field of spectacles and hinges for spectacle frame, and relates more particularly to an improvement of an elastic hinge element for spectacle frame of the type described by International Application No. WO 00/68730.

The present invention thus relates to an elastic hinge element for spectacle frame, comprising a housing comprising a hollow longitudinal portion comprising a guiding area and at least one cavity comprising a retaining wall, a slide arranged in the hollow portion according to a longitudinal translation axis, comprising a protruding part extending outside the hollow portion, a guided part cooperating with the guiding area, a central part and a rod, a spring for returning the slide to a rest position, a compression part of the spring, coupled with the rod and forming a rear stop for the spring, and a bushing forming a front stop for the spring, comprising a body mounted around the central part of the slide and at least one elastic tab turned towards the front of the hollow portion according to a determined angle, the end of which presses on the retaining wall.

As a reminder, such a classic hinge element is represented in FIG. 1A. The hinge element comprises a housing 1 in which a hollow portion 2 is made, and a slide 3 arranged in the hollow portion 2. The hollow portion 2 comprises a guiding area 2-1 for guiding the slide 3 according to a longitudinal translation axis T and opens onto the front of the hinge element to form a front orifice. The slide 3, also represented in FIG. 1B, comprises an end 3-1 forming a hinge knuckle, extending outside the hollow portion 2, a guided part 3-2 cooperating with the guiding area 2-1, a central part 3-3 and a rod 3-4. A spring 4 is mounted around the rod 3-4, between a bushing 5 and a compression part 3-5 that is coupled with the end of the rod 3-4. The bushing 5 comprises a body 5-1 slidably mounted around the rod 3-4 and two elastic tabs 5-2, 5-3 facing forwards according to a determined angle in relation to the translation axis. In the rest position shown in FIG. 1A, the end of each elastic tab 5-2, 5-3 enters a cavity 6, 7 to come and press on a retaining wall 6-1, 7-1 substantially perpendicular to the translation axis. As a result, when the slide is pulled forwards, the bushing 5 is translation blocked and the spring is compressed between the mobile compression part 3-5 and the fixed body 5-1 of the bushing 5.

Such a hinge element is only a few millimeters in length and is frequently used in the spectacles industry. It is generally fixed by welding or gluing onto a spectacle frame arm 8 schematically represented in FIG. 1A. The knuckle 3-1 is generally linked to a hinge element coupled with the frame, such as a tenon, to obtain an arm hinge.

Despite the small dimensions of this hinge element, it is desired to reduce its length so as to produce ultra-compact hinges that are even more aesthetically discreet.

Reducing the length of the hinge element involves reducing the length of the slide. This length depends on the lengths of the four useful parts of the slide, i.e. the part forming the knuckle 3-1, the guided part 3-2, the central part 3-3, and the rod 3-4 that bears the spring and the body 5-1 of the bushing.

Now, a decrease in the length of the guided part 3-2 beyond a determined minimal length would excessively weaken the hinge element, as this part must viably withstand forces and stresses exerted in directions perpendicular to the translation axis. To guarantee a good resistance to the off-axis loads while reducing the length of the guided part, a two-point guiding could be considered, by adding a guiding element at the rear end of the slide, for example using the compression part as additional guiding element. However, using the rear end of the slide would weaken the axis of the slide as the latter would be subject to flexion. Moreover, the compression part is generally an inexpensive element the manufacturing of which is basic, obtained for example by striking the end of the rod 3-4 so as to make a blister appear that translation-blocks the spring. Providing a guiding element at the rear of the slide is therefore not desirable.

Secondly, the length of the central part 3-3 of the slide is imposed by the length of the bushing 5, which is approximately equal to the sum of the length of the body 5-1 of the bushing and that of the elastic tabs 5-2, 5-3. The central part 3-3 indeed enables the retraction of the elastic tabs when the slide equipped with the bushing and the spring is introduced into the hollow portion passing through the front orifice. Now, the length of the tabs of the bushing is also subject to certain technological stresses, and cannot be excessively reduced.

Finally, the length of the rod 3-4 cannot itself be reduced below a minimal spring length, corresponding to a targeted minimal backmoving force, to which the length of the body of the bushing is added.

BRIEF SUMMARY OF THE INVENTION

Thus, the present invention aims to reduce the length of the slide of a hinge element of the type described above without reducing the length or the size of the essential elements of the hinge, i.e. the length of the guided part, the length of the bushing, and the length of the spring.

According to the present invention, this object is achieved by providing an elastic hinge element for a spectacle frame, comprising a housing comprising a hollow longitudinal portion comprising a guiding area and at least one cavity comprising a retaining wall, a slide arranged in the hollow portion according to a longitudinal translation axis, comprising a protruding part extending outside the hollow portion, a guided part cooperating with the guiding area, a central part and a rod, a spring for returning the slide to a rest position, a compression part for compressing the spring, coupled with the rod, forming a rear stop for the spring, and a bushing forming a front stop for the spring, comprising a body mounted around the central part of the slide and at least one elastic tab turned towards the front of the hollow portion according to a determined angle, the end of which presses on the retaining wall, in which the cavity comprising the retaining wall is situated in the guiding area and opens into the latter, and the guided part of the slide comprises at least one guiding face that comprises firstly a recess into which a portion of the elastic tab extends when the slide is in rest position, and secondly guiding edges situated along the edge of the recess.

According to one embodiment, the guided part comprises a recess of a size sufficient to ensure the total retraction of the elastic tab when the bushing is introduced into the hollow portion passing through the guiding area.

According to one embodiment, the proximal part of the elastic tab extends entirely in the guiding area and the body of the bushing abuts against the guided part of the slide.

According to one embodiment, the cavity comprising the retaining wall opens onto the outside of the housing.

According to one embodiment, the bushing has two elastic tabs, the guided part of the slide has two first guiding faces and two second guiding faces comprising two recesses receiving the elastic tabs and guiding edges situated along the edge of the recesses.

According to one embodiment, the guided part of the slide has in its region comprising the recess, a section substantially in the form of an "H" with the central cross of the "H".

According to one embodiment, the guided part of the slide has in its region comprising the recess, a section substantially in the form of an "H" without the central cross of the "H".

According to one embodiment, the recesses are made in the two narrowest faces of the guided part of the slide.

According to one embodiment, the recesses are made in the two widest faces of the guided part of the slide.

According to one embodiment, the central part of the slide is a prolongation of a rod bearing the spring.

The present invention also relates to a spectacle frame, comprising an elastic hinge element according to the present invention.

The present invention also relates to a spectacle frame arm, comprising an elastic hinge element according to the present invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 2:
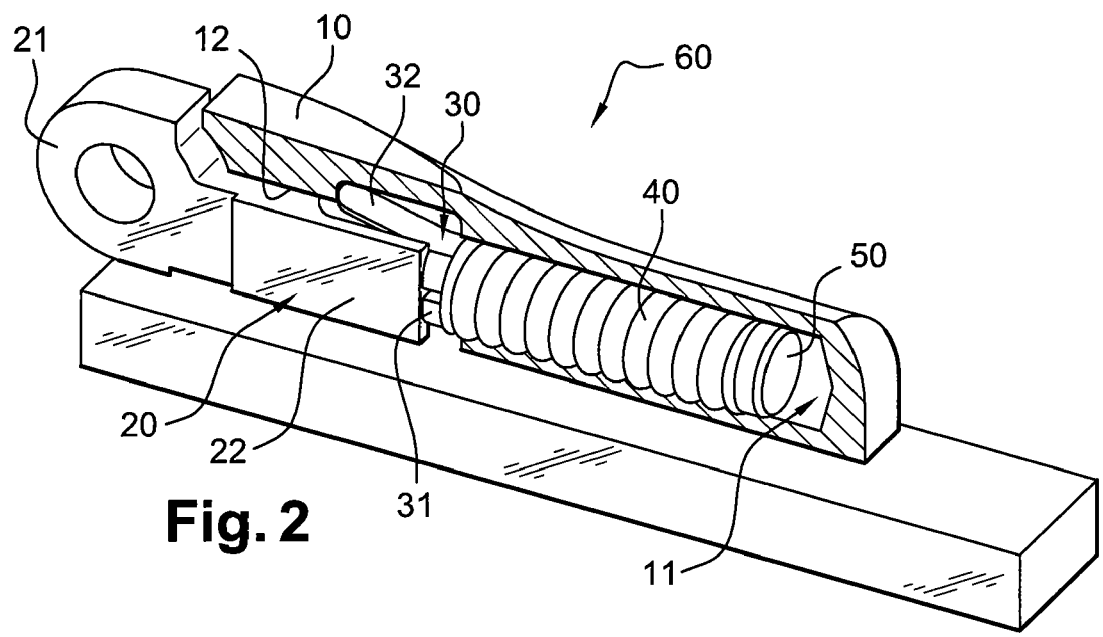
FIG. 2 is a partial cross-sectional perspective view of a hinge element according to a first preferred embodiment of the present invention.

FIG. 2 is an overall view of an elastic hinge element 60 according to the present invention, represented in rest position. The element 60 classically comprises a housing 10, represented in a cross-section, a slide 20, a bushing 30, a coil spring 40, and a compression part 50 for compressing the spring, forming a rear stop for the spring.

Figure 3:
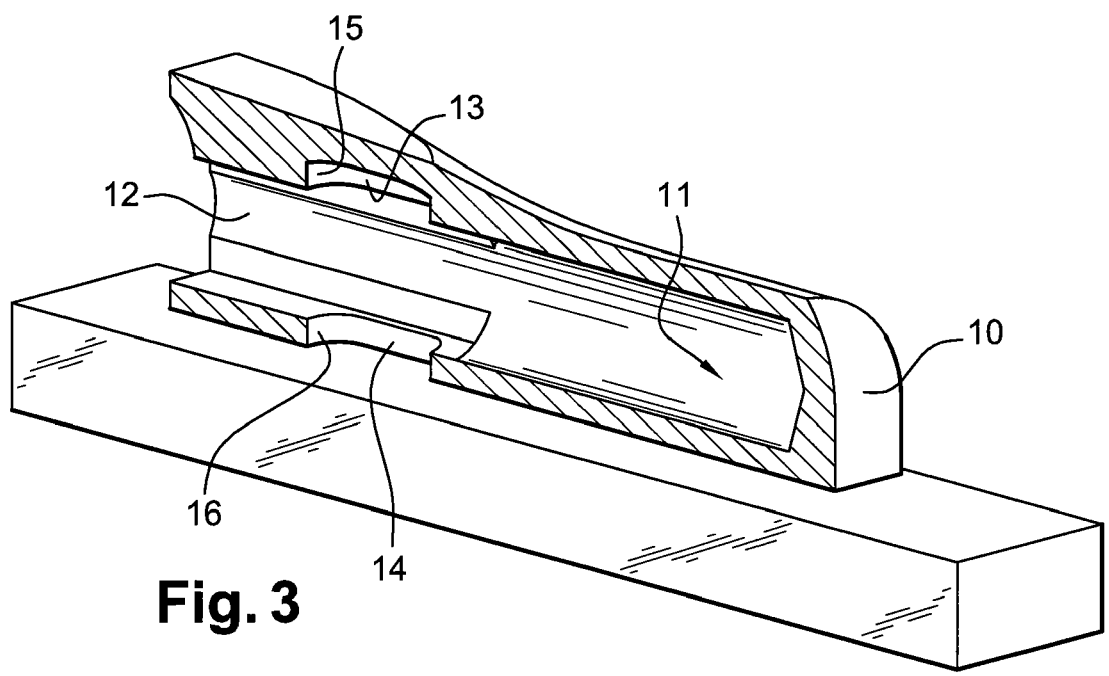
FIG. 3 is a cross-section of a housing of the hinge element shown in FIG. 2.
Figure 4:
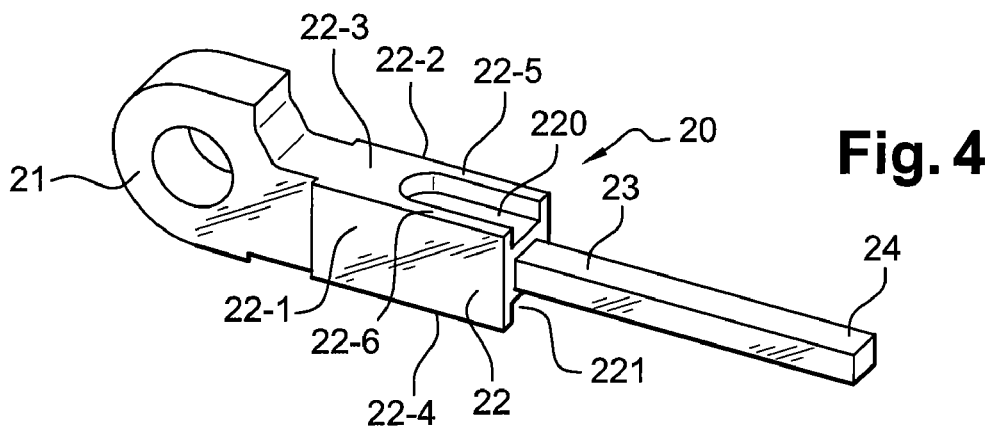
FIG. 4 is a perspective view of a slide present in the hinge element shown in FIG. 2.
Figure 5:
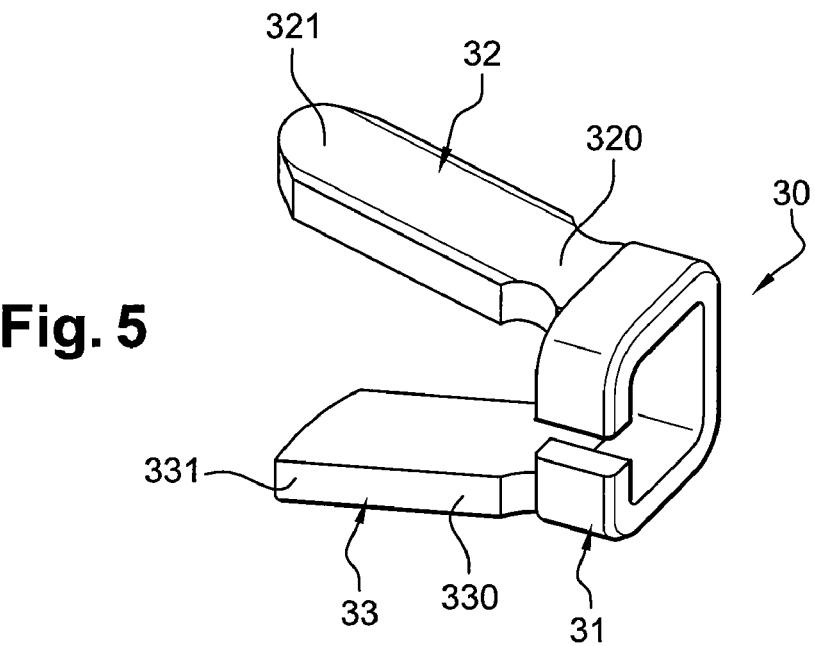
FIG. 5 is a perspective view of a bushing present in the hinge element shown in FIG. 2.

The housing 10 is represented in greater detail in FIG. 3, the slide 20 is represented in greater detail in FIG. 4, and the bushing is represented in greater detail in FIG. 5. Certain references in FIGS. 3 to 5 are not reproduced in FIG. 2, for the sake of readability of this figure.

The housing 10 comprises a hollow longitudinal portion 11 receiving the slide 20 that opens onto the front of the hinge element to form a front orifice. The shape of the hollow portion is designed to be able to introduce the assembly formed by the slide, the bushing, the spring and the compression part into the hollow portion 11, passing through the front orifice.

The slide 20 comprises a protruding part 21 forming a knuckle, that extends from the front orifice to the outside of the hollow portion 11, a guided part 22, as well as a central part 23 and a rear rod 24, the central part 23 and the rod 24 having a smaller section than the guided part 22. Here, the central part 23 and the rod 24 are formed by one and the same rod, of rectangular, round or polygonal section, around which the bushing 30 and the spring 40 are threaded. The protruding part 21 comprises a pierce point intended to receive a pin for connecting with a tenon (not represented). It shall be noted that the compression part, although represented in the Figure as an element distinct from the rod, can be classically formed by a blister of the end of the rod. This part is in this case part of the rod itself.

The hollow portion 11 comprises a guiding area 12 having guiding walls cooperating with the guided part 22 of the slide, and cavities 13, 14 comprising two retaining walls 15, 16 substantially perpendicular to the translation axis and turned towards the rear of the hollow portion 11. The guiding walls do not necessarily cover the entire guiding area 12, as represented for example in FIG. 3 where it can be seen that the guiding area is obtained by piercing a cylindrical orifice and then by machining flat guiding walls in the cylindrical orifice forming sorts of rails.

Furthermore, the cavities 13, 14 are for example obtained by transversally piercing the housing 10, such that the cavity corresponding to the introduction of the piercing tool, here the cavity 14, opens onto the outside of the housing.

The bushing 30 classically comprises a body 31, that is threaded around the central part 23 of the slide, and two elastic tabs 32, 33 facing forwards forming an angle "A" in relation to the translation axis of the slide. Each elastic tab comprises a proximal part 320, 330 linked to the body 31, and a distal part 321, 331.

When the slide 20, after being equipped with the bushing 30, with the spring 40 and with the compression part 50, is introduced into the hollow portion 11 passing through the front orifice, the elastic tabs 32, 33 fold up towards the slide when the latter passes through the guiding area 12. Once the operation performed, the elastic tabs loosen and their ends lodge in the cavities 13, 14.

Figure 1A:
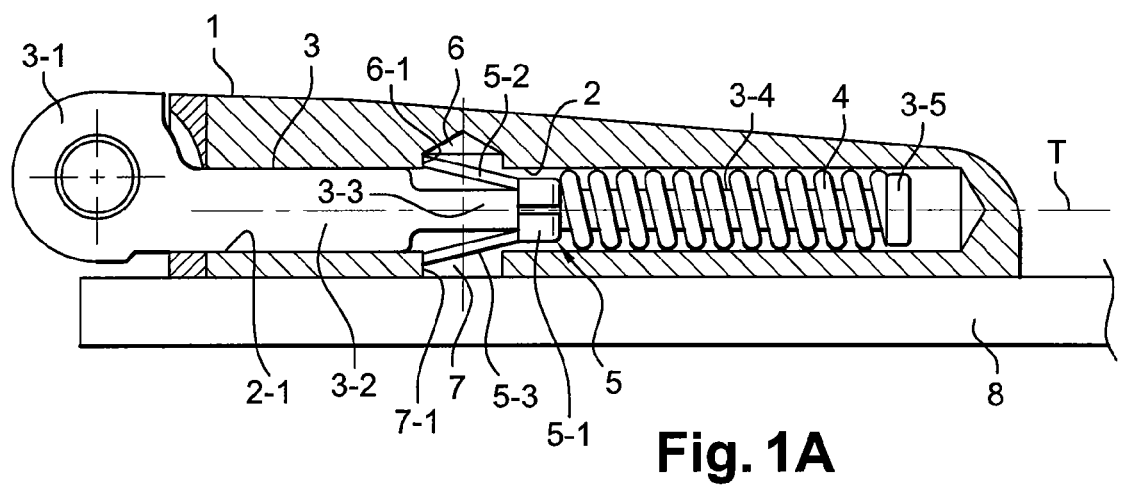
FIG. 1A is a cross-section of a classic or prior art elastic hinge element.

According to the present invention, the cavities 13, 14 are made in the guiding area 12 itself, and open onto the guiding area 12 instead of opening onto a region of the hollow portion 11 corresponding to the central part 23 of the slide, as is the case in prior art (refer to FIG. 1A). Again according to the present invention, the guided part 22 of the slide has two recesses 220, 221 each provided for receiving the proximal part 320, 330 of one of the elastic tabs 32, 33. Thus, the body 31 of the bushing is pushed by the spring 40 against the guided part 22 of the slide, the spring being preferably substantially compressed or bordering on compression when the slide is in rest position.

When the slide 20 is inserted into the hollow portion 11, and more particularly when the bushing passes through the guiding area 12, the elastic tabs 32, 33 of the bushing retract into the recesses 220, 221. When the rest position represented in FIG. 2 is reached, they extend in the guiding area 12 and not in the region of the hollow portion 11 corresponding to the central part 23 of the slide, as is the case in prior art. More particularly, the proximal parts 320, 330 of the elastic tabs extend in the recesses 220, 221, the distal parts 321, 331 of the elastic tabs extend in the cavities 13, 14, and the ends of the elastic tabs are opposite the retaining walls 15, 16.

When the slide is pulled forwards, the spring 40, as it compresses, pushes the elastic tabs against the retaining walls 15, 16. The latter thus translation-block the bushing 30, the spring 40 then being compressed between the compression part 50 and the bushing 30, and ensuring the slide returns to rest position.

In the hinge element structure that has just been described, the longitudinal extension of the elastic tabs 32, 33, which is mathematically equal to the length of the tabs multiplied by the cosine of the angle "A", is not taken into account to determine the length of the central part 23 of the slide and as a result to determine the total length of the slide. The length of the central part 23 of the slide only depends on the length of the body 31 of the bushing. The latter, as represented in FIG. 5, is here a sort of square section ring formed for example by folding a metal strip cut in the shape of π having two perpendicular tabs that form the elastic tabs.

Furthermore, as it can be seen in FIG. 4, the guided part 22 of the slide has left 22-1 and right 22-2 lateral faces that provide the right and left lateral guiding, and upper 22-3 and lower 22-4 lateral faces that provide the upper and lower lateral guiding. The recesses 220, 221 are made here on the faces 22-3, 22-4 and extend here over approximately half the length of the guided part 22.

According to the present invention, the elastic tabs 32, 33 and the recesses 220, 221 are here narrower than the faces 22-3, 22-4 and advantageously on the edge of the recesses 220, 221, narrow bands (FIG. 4, face 22-3, bands 22-5, 22-6) remain which form sorts of rails or glides that also provide the upper and lower lateral guiding of the slide, the rear part of the guided part 22 thus having a section substantially in the shape of an H.

Thus, the guided part 22 has a front part that is devoid of any recess and that supports the slide in four complementary directions perpendicular to the translation axis, and a rear part bearing the recesses 220, 221, that also advantageously supports the slide in the four directions.

Figure 6:
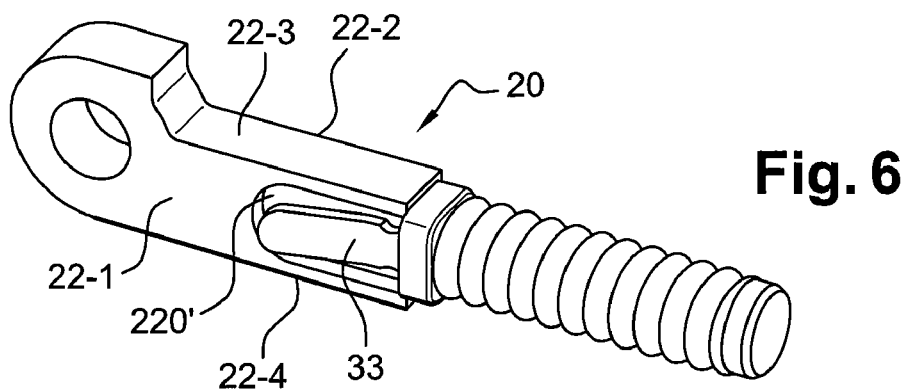
FIG. 6 is a perspective view of a slide according to an alternative embodiment of the present invention.

Various alternatives of the present invention can be provided by those skilled in the art. In an alternative embodiment represented in FIG. 6, the recesses 220' are made in the left 22-1 and right 22-2 lateral faces of the guided part of the slide, the width of which, corresponding to the height of the slide, is greater than the width of the upper and lower faces of the guided part.

Figure 1B:
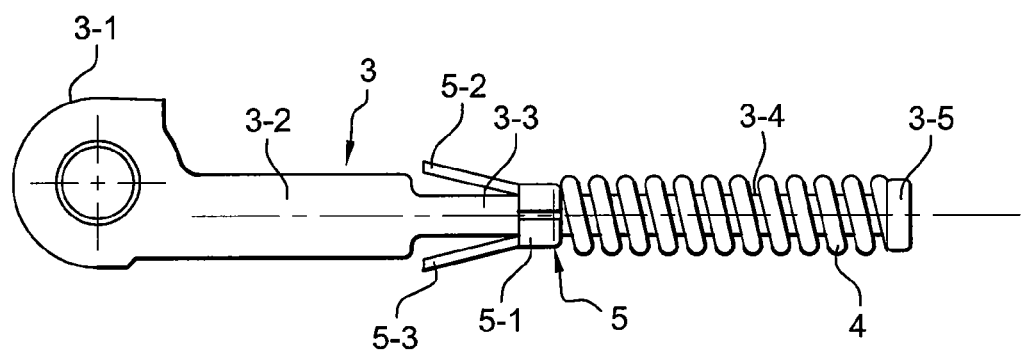
FIG. 1B is a side elevational view of a slide present in the prior art hinge element shown in FIG. 1A.

In other alternative embodiments, the guided part of the slide can have a round, oval or polygonal section. The recesses receiving the proximal parts of the elastic tabs can have various shapes, for example they can have an inclined bottom corresponding to an angle of retraction of the elastic tabs when assembling the hinge element. They can also be through-hole and meet, the rear part of the guided part of the slide having in this case the shape of an "H" without the central cross of the H. Furthermore, the bushing may comprise three, or even four elastic tabs, a corresponding number of recesses then being provided in the guided part of the slide. The bushing can also comprise only one elastic tab, although a symmetrical bushing structure is better suited to a good distribution of the spring retaining forces. Secondly, although it is advantageous for the proximal parts of the elastic tabs to extend entirely in the recesses, so that the body of the bushing is in contact with the guided part of the slide and the length of the central part of the slide is minimal, providing an intermediate embodiment between prior art and the embodiment that has just been described falls within the scope of the present invention. In this embodiment, the section of the central part 23 of the slide has an enlargement translation-blocking the body of the bushing before the latter abuts against the guided part (refer for example to FIG. 1B). The elastic tabs thus comprise a proximal part that extends along the central part of the slide, a central part that extends in the recesses according to the present invention, and a distal part that extends in the cavities comprising the retaining walls. Thus, irrespective of the embodiment of the present invention, the cavities 13, 14 comprising the retaining walls are arranged in the guiding area 12 and the ends of the elastic tabs 32, 33 extend up to the guiding area thanks to the recesses according to the present invention. The present invention thus enables the body of the bushing to be moved as close as desired to the guided part of the slide and the total length of the hinge element to be reduced accordingly, while respecting the minimal lengths of the spring and of the guiding part that are imposed by the technological stresses and the solidity requirements of the hinge element.

Finally, although it was stated above that the recesses according to the present invention are formed so as to enable the elastic tabs to fully retract when the slide is introduced into the hollow portion of the housing, this feature is only required if the slide is introduced into the housing in this manner.

Various arrangements of a hinge element according to the present invention may be made. Although it is generally fixed onto spectacle frame arms, such a hinge element can also be mounted onto the rim of the frame, or onto a fixed arm part coupled with the frame rim.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:
1. An elastic hinge element for a spectacle frame, comprising:
   a housing comprising a hollow longitudinal portion comprising a guiding area, the guiding area having at least one cavity defining a retaining wall,
   a slide arranged in the hollow portion according to a longitudinal translation axis, comprising a protruding part extending outside the hollow portion, a guided part cooperating with the guiding area, a central part and a rod,
   a spring for returning the slide to a rest position,
   a compression part for compressing the spring, coupled with the rod, forming a rear stop for the spring, and
   a bushing forming a front stop for the spring, comprising a body mounted around the central part of the slide and at least one elastic tab extending towards a front of the hollow portion according to a determined angle, a distal end of the at least one elastic tab presses on the retaining wall, wherein the cavity comprising the retaining wall opens out in the guiding area, and the guided part of the slide comprises at least one first guiding face that comprises:

a recess into which a portion of the at least one elastic tab extends when the slide is in the rest position, and guiding edges situated along the recess, an entire length of the guiding edges being in contact with the guiding area of the hollow longitudinal portion of the housing in and between the rest position and an extended position of the slide.

2. The elastic hinge element according to claim 1, wherein the recess is sized to ensure the total retraction of the elastic tab in the slide when the bushing is introduced into the hollow portion passing through the guiding area.

3. The elastic hinge element according to claim 1, wherein a proximal part of the at least one elastic tab extends entirely in the guiding area and the body of the bushing mounted around the central part of the slide abuts against the guided part of the slide.

4. The elastic hinge element according to claim 3, wherein the cavity opening out in the guiding area also opens out on the outside of the housing.

5. The elastic hinge element according to claim 1, wherein the bushing has two elastic tabs, the guided part of the slide has two first guiding faces and two second guiding faces comprising two recesses receiving the elastic tabs and the guiding edges being situated alongside the recesses.

6. The elastic hinge element according to claim 5, wherein the guided part of the slide has in its region comprising the recess, a cross-section substantially in the form of an "H".

7. The elastic hinge element according to claim 5, wherein the guided part of the slide has in its region comprising the recess, a cross-section substantially in the form of an "H" without the central cross of the "H".

8. The elastic hinge element according to claim 5, wherein the second guide faces are relatively narrow when compared to the first guide faces and the recesses are made in the two second guide faces of the guided part of the slide.

9. The elastic hinge element according to claim 5, wherein the second guide faces are relatively narrow when compared to the first guide faces and the recesses are made in the two first guide faces of the guided part of the slide.

10. The elastic hinge element according to claim 1, wherein the central part of the slide is a prolongation of a rod bearing the spring.

11. A spectacle frame, comprising an elastic hinge element according to claim 1.

12. A spectacle frame arm, comprising an elastic hinge element according to claim 1.

13. An elastic hinge element for a spectacle frame, comprising:

a housing having a hollow interior defining a guiding area, the guiding area having at least one cavity recessed into the housing to form a retaining wall;

a slide positioned in the hollow interior, the slide including a protruding part located outside the guiding area, a guided part located within the guiding area and a rod having a rear stop;

a spring positioned over the rod and abutting the rear stop; and a bushing mounted on the rod and positioned between the guided part and the spring, the bushing having at least one elastic tab extending toward a front of the hollow portion at a determined angle, a distal end of the at least one elastic tab abutting the retaining wall, wherein the guided part of the slide includes at least one first guiding face having a recess therein, the at least one elastic tab extending into the recess in a rest position, the recess forming at least one guiding edge proximate the recess, an entire length of the at least one guiding edge being in continuous sliding contact with the guiding area.

* * * * *